United States Patent
Solki

(10) Patent No.: US 10,416,746 B2
(45) Date of Patent: Sep. 17, 2019

(54) ADAPTIVE ENERGY OPTIMAL COMPUTING

(71) Applicant: Atlazo, Inc., La Jolla, CA (US)

(72) Inventor: Shahin Solki, La Jolla, CA (US)

(73) Assignee: ATLAZO, INC., La Jolla, CA (US)

( * ) Notice: Subject to any disclaimer, the term of this patent is extended or adjusted under 35 U.S.C. 154(b) by 0 days.

(21) Appl. No.: 16/244,509

(22) Filed: Jan. 10, 2019

(65) Prior Publication Data

US 2019/0212799 A1     Jul. 11, 2019

Related U.S. Application Data

(60) Provisional application No. 62/615,632, filed on Jan. 10, 2018.

(51) Int. Cl.

| | |
|---|---|
| *G06F 1/32* | (2019.01) |
| *G06F 11/30* | (2006.01) |
| *G06F 1/08* | (2006.01) |
| *G06F 1/3206* | (2019.01) |
| *G06F 1/3296* | (2019.01) |
| *G06F 1/324* | (2019.01) |

(52) U.S. Cl.
CPC .............. *G06F 1/3206* (2013.01); *G06F 1/08* (2013.01); *G06F 1/324* (2013.01); *G06F 1/3296* (2013.01); *G06F 11/3062* (2013.01)

(58) Field of Classification Search
CPC ...... G06F 1/3206; G06F 1/324; G06F 1/3296; G06F 11/3062; G06F 1/28
See application file for complete search history.

(56) References Cited

U.S. PATENT DOCUMENTS

| | | |
|---|---|---|
| 6,636,022 B2 | 10/2003 | Sluijs |
| 7,174,523 B2 | 2/2007 | Engel |
| 7,913,071 B2 * | 3/2011 | Mallik ................. G06F 1/3203 713/1 |

(Continued)

FOREIGN PATENT DOCUMENTS

JP     2014064436 A1     4/2014

OTHER PUBLICATIONS

David M. Harris et al., "A transregional model for near-threshold circuits with application to minimum-energy operation," in Proc. 2010 Int. Conf. Microelectronics (ICM), Cairo, Egypt, Dec. 19-22, 2010, pp. 64-67.

(Continued)

*Primary Examiner* — Stefan Stoynov
(74) *Attorney, Agent, or Firm* — Perkins Coie LLP

(57) ABSTRACT

Methods, devices and systems are described that relate to an energy optimal computing control system, where clock rates and supply voltage are control knobs to adjust the total energy consumption of an electronic circuit. An ultra-wide voltage range, such as from near-threshold voltage to the device maximum voltage, is used to maximize the performance and to minimize the energy consumption. One example device includes a processor that receives or determines the temperature of the electronic circuit, and determines the optimum voltage levels and clock rates for the electronic circuit at the operating temperature. This information is provided to a voltage regulator and a clock generator to adjust the supply voltage and clock frequency accordingly.

30 Claims, 9 Drawing Sheets

(56) References Cited

U.S. PATENT DOCUMENTS

| | | | |
|---|---|---|---|
| 8,464,199 | B1 | 6/2013 | Charlebois |
| 9,317,048 | B2* | 4/2016 | Kuang ................. G06F 1/3206 |
| 2006/0114017 | A1 | 6/2006 | El-Kik |
| 2007/0018712 | A1 | 1/2007 | GK |
| 2007/0089078 | A1 | 4/2007 | Engel |
| 2008/0122291 | A1 | 5/2008 | Uchimoto |
| 2009/0284240 | A1 | 11/2009 | Zhang |
| 2010/0194434 | A1 | 8/2010 | Tran Vo |
| 2010/0327952 | A1 | 12/2010 | Wu |
| 2011/0248764 | A1* | 10/2011 | Das ......................... G06F 1/08 |
| | | | 327/299 |
| 2012/0124538 | A1 | 5/2012 | Lackey |
| 2012/0159216 | A1* | 6/2012 | Wells ...................... G06F 1/26 |
| | | | 713/322 |
| 2014/0152344 | A1 | 6/2014 | Chiou |
| 2015/0214841 | A1 | 7/2015 | Ramorini et al. |
| 2016/0164497 | A1 | 6/2016 | Agarwal |
| 2017/0272073 | A1* | 9/2017 | Betz ................. H03K 19/00369 |
| 2018/0321092 | A1 | 11/2018 | Jones |

OTHER PUBLICATIONS

S. Kosonocky et al., "Designing in Scaled Technologies: 32nm and Beyond," presented at 2012 Symposia on VLSI Technology and Circuits, Honolulu, HI, Jun. 2012.

Jungseob Lee et al., "Improving Throughput of Power-Constrained GPUs Using Dynamic Voltage/Frequency and Core Scaling," in Proc. 2011 Int. Conf. Parallel Architectures and Compilation Techniques (PACT), Galveston, TX, Oct. 10-14, 2011, pp. 111-120.

Massimo Alioto, "Ultra-Low Power VLSI Circuit Design Demystified and Explained: A Tutorial," IEEE Trans. Circuits Syst. I, Reg. Papers, vol. 59, pp. 3-29, Jan. 2012.

Bo Zhai et al., "Energy-Efficient Subthreshold Processor Design," IEEE Trans. Very Large Scale Integr. (VLSI) Syst., vol. 17, pp. 1127-1137, Aug. 2009.

Y. Pu et al., "Misleading energy and performance claims in sub/near threshold digital systems," in Proc. 2010 IEEE/ACM Int. Conf. Computer-Aided Design (ICCAD), San Jose, CA, Nov. 7-11, 2010, pp. 625-631.

D. Bol et al., "Interests and Limitations of Technology Scaling for Subthreshold Logic," IEEE Trans. Very Large Scale Integr. (VLSI) Syst., vol. 17, pp. 1508-1519, Oct. 2009.

S. Jain et al., "A 280mV-to-1.2V wide-operating-range IA-32 processor in 32nm CMOS," in Digest of Technical Papers 2012 IEEE Int. Solid-State Circuits Conf. (ISSCC), San Francisco, CA, Feb. 19-23, 2012, pp. 66-68.

D. Wolpert and P. Ampadu, "Exploiting Programmable Temperature Compensation Devices to Manage Temperature-Induced Delay Uncertainty," IEEE Trans. Circuits and Syst. I: Reg. Papers, vol. 59, pp. 735-748, Apr. 2012.

BSIM4.3.0 MOSFET Model—User's Manual, Department of Electrical Engineering and Computer Sciences, University of California, Berkeley, CA, 2003.

M. Faisal, N. E. Roberts and D. D. Wentzloff, "A 300nW near-threshold 187.5-500 kHz programmable clock generator for ultra low power SoCs," 2015 IEEE SOI-3D-Subthreshold Microelectronics Technology Unified Conference (S3S), Rohnert Park, CA, 2015, pp. 1-3.

M. Huang and C. Hung, "Full-custom all-digital phase locked loop for clock generation," VLSI Design, Automation and Test(VLSI-DAT), Hsinchu, 2015, pp. 1-4.

J. Liu et al., "A 0.8V, sub-mW, varactor-tuning ring-oscillator-based clock generator in 32nm CMOS," IEEE Asian Solid-State Circuits Conference 2011, Jeju, 2011, pp. 337-340.

A. Tajalli and Y. Leblebici, "A 9 pW/Hz adjustable clock generator with 3-decade tuning range for dynamic power management in subthreshold SCL systems," 2010 Proceedings of ESSCIRC, Seville, 2010, pp. 242-245.

X. Zhang and A. B. Apsel, "A Low-Power, Process-and-Temperature-Compensated Ring Oscillator With Addition-Based Current Source," in IEEE Transactions on Circuits and Systems I: Regular Papers, vol. 58, No. 5, pp. 868-878, May 2011.

Man et al, "A High Slew-Rate Push-Pull Output Amplifier for Low-Quiescent Current Low-Dropout Regulators With Transient-Response Improvement", IEEE Transactions on Circuits and Systems II: Express Briefs, 2007.

Y. Lu, et al., "A 0.65ns-Response-Time 3.0 1ps FOM Fully-Integrated Low-Dropout Regulator with Full-Spectrum Power-Supply-Rejection for Wideband Communication Systems", IEEE ISSCC, pp. 306-307, Feb. 2014.

Chen, Y. et. al, "An Ultra-low Quiescent Current Output Capacitor-less Low-Dropout Regulator with a Novel Slew-rate-enhanced Circuit", 2014 IEEE International Symposium on Radio-Frequency Integration Technology.

X. Ming, et al, "A Low-Power Ultra-Fast Capacitor-Less LDO With Advanced Dynamic Push-Pull Techniques", International Conference on VLSI and System-on-Chip, pp. 54-59, 2011.

Liu et al, "An Ultra-Low Power Voltage Regulator for RFID Application", Chia-Chin, Chunhong Chen, 2013 IEEE 56th International Midwest Symposium on Circuits and Systems (MWSCAS).

Liu et al, "A 90nA quiescent current 1.5V-5V 50mA asynchronous folding LDO using dual loop control", 2016 IEEE Asian Solid-State Circuits Conference (A-SSCC).

Mazumdar et al, "A Digitally-Controlled Power-Aware Low-Dropout Regulator to Reduce Standby Current Drain in Ultra-Low-Power MCU", 2015 International Symposium on Quality Electronic Design.

Liang et al, "A 802 nA Quiescent Current and 100 mA Load Low-Dropout Regulator for Micro Energy Harvest System", 2018 2018 13th IEEE Conference on Industrial Electronics and Applications (ICIEA).

Rikan et al, "A low leakage retention LDO and leakage-based BGR with 120nA quiescent current", 2017 International SoC Design Conference (ISOCC).

Qian, J. et al. (Dec. 2009). Single-inductor Dual-output DC/DC Buck converter With High full-load Efficiency. 10.1109/EDSSC.2009.5394235. (3 pages).

Tao, C. et al. (Nov. 2011). A Buck Converter With Reduced Output Spurs Using Asynchronous Frequency Hopping. IEEE Transactions on Circuits and Systems—II: Express Briefs, vol. 58, No. 11, p. 709-713. (5 pages).

Ko, Y. et al. (Jun. 2014) Load-Balance-Independent High Efficiency Single-Inductor Multiple-Output (SIMO) DC-DC Converters. Journal of Semiconductor Technology and Science, vol. 14, No. 3., p. 300-312. (13 pages).

International Application No. PCT/US2019/012414 International Search Report and Written Opinion dated May 8, 2019.

Solki, Shahin et al. U.S. Appl. No. 16/242,405 Non-Final Office Action dated Mar. 29, 2019.

\* cited by examiner

| Thermal Voltage | $K_{VDS} = 1 - \exp\left(-\frac{V_{DS}}{V_T}\right)$ | |
|---|---|---|
| $V_T = kT/q$ | $V_{DS} = V_{DD} = 750mV$ | $V_{DS} = V_{DD} = 300mV$ |
| $V_T @ 27°C = 26mV$ | 1.000000000 | 0.9999902521 |
| $V_T @ 10°C = 27.13mV$ | 1.000000000 | 0.9999842588 |
| $V_T @ 110°C = 34.65mV$ | 0.9999999996 | 0.9999270626 |

FIG. 2

ADAPTIVE ENERGY OPTIMAL COMPUTING

RELATED APPLICATIONS

This application claims priority to the provisional application with Ser. No. 62/615,632, titled "Energy Optimal Computing," filed Jan. 10, 2018. The entire contents of the above noted provisional application are incorporated by reference as part of the disclosure of this document.

TECHNICAL FIELD

The present disclosure relates to circuits for supplying power and clock to electronic circuits.

BACKGROUND

Many integrated circuits such as systems on a chip (SoC), processors, cell phone chips, and other circuits vary in performance over temperature, vary due to semiconductor process variations, and vary according to where on a wafer the chip was located during processing. Techniques are needed to compensate for these variations and to allow for operating these circuits with power efficiency while meeting the expected performance. While not limited to Internet of Things (IOT), the small form factor, ultra-low power consumption, and low cost requirements make power consumption and high efficiency power management critically important in IoT applications since they directly impact the battery lifetime of the system.

BRIEF DESCRIPTION OF THE DRAWINGS

FIG. 2 illustrates a listing of the off-state leakage current for different thermal voltages at different temperatures obtained in accordance with the disclosed embodiments.

DETAILED DESCRIPTION

The disclosed embodiments, among other features and benefits, provide a collective approach to both performing various SoC related tasks while minimizing the total energy consumption of logic circuits such as processing units. One aspect of the disclosed embodiments relates to an energy optimal computing (EOC) control system, where clock rates and supply voltage are control knobs to dynamically adjust the total energy consumption of the circuit. As will be described in more details in the sections that follow, an ultra-wide voltage range from near-threshold voltage to the device maximum voltage can be used to maximize the performance for high-throughput use-cases or to minimize the energy consumption for the low-throughput use-cases. To achieve a minimum energy consumption, the logic circuit operates near an optimal-voltage, which is close to the effective threshold voltage. At the optimal supply voltage, the energy efficiency of the semiconductor devices is maximized leading to the minimum energy consumption of the circuit.

In a complex system on chip (SoC), a clock frequency and supply voltage for each given domain may be adjusted to mitigate the effects such as excessive temperature or load current. There are several methods devised in the industry to attain the above objectives. These methods are often based on minimizing the circuit power consumption, which is adequate for moderate to high voltage level ranges, where the circuit dynamic power is dominant. However, for ultra-low power applications, operating at a low voltage level with a low utilization (activity rate) of the logic circuits, the leakage power can become a dominant factor. Furthermore, in current techniques the impact of the operating temperature on the total energy consumption is not taken into account, and these techniques only rely on timing closure at extreme temperatures (e.g., very low such as −30 C and very high such as 125 C).

To further illustrate the underlying issues, some supply voltage rails within a typical SoC may need a fixed or static source (e.g., IO voltage) and others may need a variable source that can be adjusted dynamically (e.g., logic core voltage). The static voltage rails may still require mechanisms (e.g., power gating) to turn them off for a given period. In doing so, isolation cells/islands are necessary between on and off areas of the chip. If there is sequential logic within the off-domain at power-up, they require a reset signal to place them in a known state. This combination of isolation cells, the voltage on/off, reset and other conditions demand for a comprehensive management unit even for fixed voltage domains. Dynamically adjusted voltage rails require additional control mechanisms, increasing the complexity of the control system.

Figure 1:
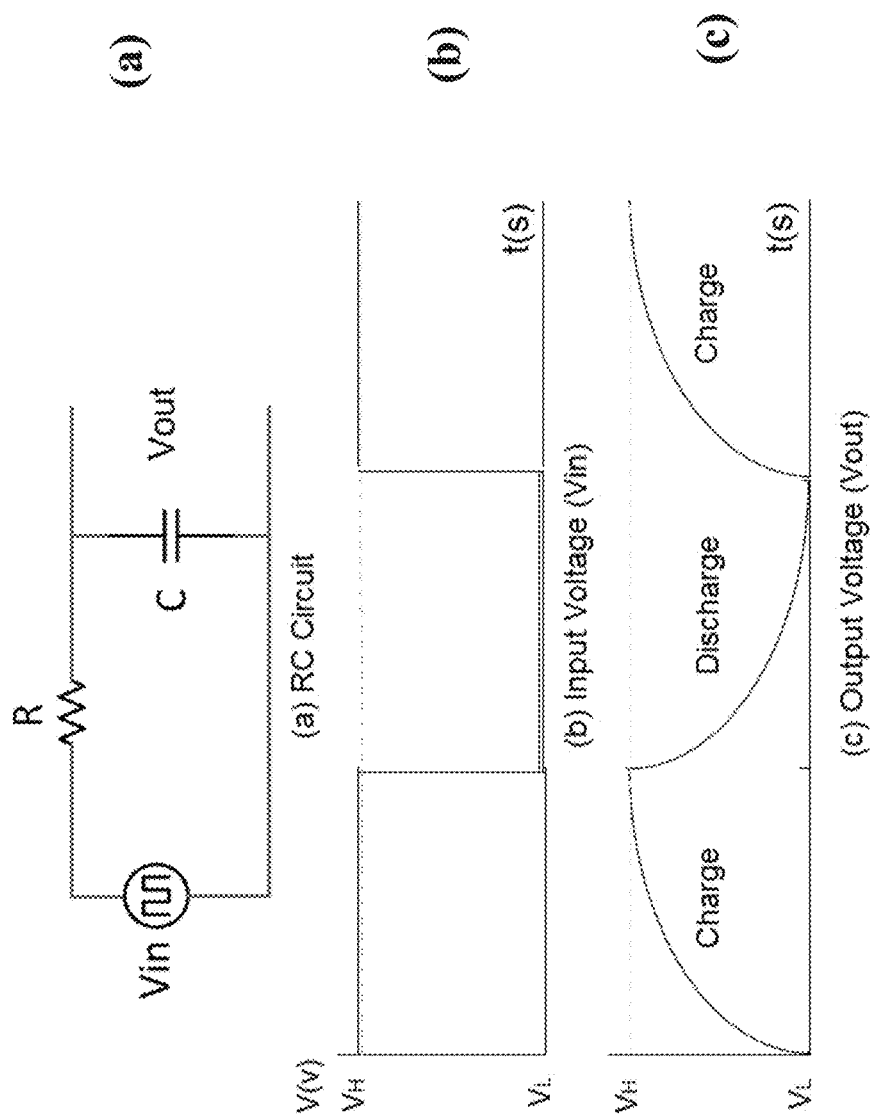
FIG. 1 is an RC circuit and its corresponding input and output voltage waveforms.

The dynamic energy consumption in integrated circuits is due to transitions from high to low levels and from low to high levels. The transitions require the effective load capacitance to be charged or discharged. This can be evaluated further using FIG. 1, which depicts an RC circuit at (a). At (b), FIG. 1 depicts the input voltage ($V_{in}$) waveform as a pulse switching between $V_L$ (logic low voltage level) and $V_H$ (logic high voltage level). At (c), FIG. 1 illustrates the corresponding output voltage ($V_{out}$), which is across the capacitor. In the illustrated example, the period of the input voltage pulse is sufficiently large to allow a full charge and discharge of the capacitor. In logic circuits, the low voltage is typically zero ($V_L=0$) and the high voltage is the supply voltage ($V_H=V_{DD}$). Under these assumptions, the total charge stored in the capacitor is given by Equation (1).

$$E_{Cap} = C \int i_c V_{out} dt_L = C \int \frac{dV_{out}}{dt} V_{out} dt = C \int_0^{V_{DD}} V_{out} dV_{out} \qquad \text{Eq. (1)}$$

$$E_{Cap} = \frac{1}{2}CV_{DD}^2.$$

Equation (1) indicates half of the energy is stored in the capacitors. The other half is dissipated on the series resistor (R) as heat. Equation (1) can be used to determine the average power consumption of the circuit for a known period, such as a clock cycle ($t_{cyl}$). Equation (1) also shows that both dynamic energy and power consumption have a quadratic relation to the supply voltage. C is the equivalent capacitance of a logic circuit, which includes both device capacitance and wire capacitance.

In the above simple example, the circuit becomes charged and then discharged on every cycle, since the input is set as a pulse. In practice, not all circuits change logic level on each and every clock cycle. As a result, the dynamic energy consumption would be less than the above value in instances in which part of circuit is not switching. In order to take this into account, an activity factor ($A_D$) may be defined as a statistical indicator. When a circuit has no transitions, the activity value will have a value of zero and when the circuit is transitioning at the clock frequency, the activity value has a value of 1. Thus, dynamic energy, $E_D$, of the circuit can be determined by:

$$E_D = A_D E_{cap} \quad \text{Eq. (2).}$$

In circuits that perform logical or arithmetic operations, the activity factor is dependent on software and data. Also, complex compute-units have several building blocks that may or may not face the same rate of activity under the same application. Therefore, based on design complexity, the circuit may be divided into sub-circuits, with an activity monitor per sub-circuit ($A_i$), and a weight ($W_i$) associated with each. In post-silicon characterization, the weights can be selected to correlate power measurement under different software applications. This requires a built-in circuit to generate $A_i$ dynamically when target applications are running. The activity factor, $A_D$, as a first order superposition can be obtained using, for example, Equation (3) shown below.

$$A_D \Sigma_{i=1}^n W_i \cdot A_i \quad \text{Eq. (3).}$$

Logic circuits are generally constructed using transistors. The role of the transistor is to act as a switch, although when transistors are turned off there is some electrical current ($I_{off}$) drawn from supply voltage, known as off-state (or off-leakage) current. This off-state current and its dependencies will be detailed below. The energy consumed due to $I_{off}$ is referred to as leakage energy ($E_L$), and may be expressed as:

$$E_L = I_{off} V_{DD} t_{cyl} \quad \text{Eq. (4).}$$

The leakage current is drawn as long as the supply voltage is applied. In Equation (4), $t_{cyl}$ specifies the duration that the leakage current is drawn.

The total energy consumption ($E_T$) of the circuit is the sum of the leakage energy ($E_L$), and the dynamic energy ($E_D$), given by:

$$E_T = E_L + E_D \quad \text{Eq. (5).}$$

By plugging Equations (2) and (4) into Eq. (5), it yields:

$$E_t = A_D \frac{C_D V_{DD}^2}{2} + I_{off} V_{DD} t_{cyl}. \quad \text{Eq. (6)}$$

One observation from Equation (6) is that when the activity factor is low, the right-hand term associated with the leakage current become a more significant factor in energy consumption. From Equation (6), it is also evident that when the supply voltage ($V_{DD}$) is reduced, energy consumption can be reduced. Minimizing $V_{DD}$ will not necessarily result in minimum energy consumption because a reduction in supply voltage increases circuit delay, which reduces the operating frequency of the system resulting in computations being slowed down. This patent document, among other features and embodiments, details an optimal voltage point, corresponding to the optimal energy point per cycle (or per operation).

As used herein, a device under test (DUT) is a logic circuit such as a processor or other logic circuit that is supplied with one or more power supply voltages and clocks. A DUT may contain millions to billions of transistors. Each MOS transistor draws a leakage current in the off-state ($V_{GS}=0$), which may be expressed by Equation (7):

$$I_{off} = I_0 \exp\left(\frac{-V_{th}}{nV_T}\right)\left(1 - \exp\left(-\frac{V_{DS}}{V_T}\right)\right). \quad \text{Eq. (7)}$$

The DUT may have several sources of supply voltage for various functions and macros. The main logic supply voltage may be denoted as $V_{DD}$. Hence, the total leakage current of all transistors supplied by $V_{DD}$ is equal to the sum of all leakage currents as:

$$I_{off\_total} = \Sigma_{i=1}^N I_{off}(i) \quad \text{Eq. (8),}$$

where N is number of the transistors. The type of transistor (e.g., PMOS or NMOS), the threshold voltage, and the effective drain-source voltage $V_{DS}$ of each device defines the transistor's leakage current for a known temperature. Equation (8) can be organized to have transistors with identical characteristics use off-state leakage current equations with the same parameters ($C_m$, $V_{th}$(m), and $V_{DS}$(M)). This allows for the re-writing of the Equation (8) as:

$$I_{off\_total} = \sum_{i=1}^m C_m \exp\left(\frac{-V_{th}(m)}{nV_T}\right)\left(1 - \exp\left(-\frac{V_{DS}(m)}{V_T}\right)\right), \quad \text{Eq. (9)}$$

where m<<N. Note that, when the transistors are stacked, the bottom transistors experience a drain-source voltage lower than $V_{DD}$ due to drop across the top transistors.

Equation (9) contains several terms and parameters that can be extracted from the DUT. Using current techniques, the extraction process takes a long time and it requires detailed knowledge of the design. The techniques disclosed herein overcome the previous shortcomings using a simplified model to estimate chip-level (or macro-level) leakage current to evaluate the supply voltage scaling effect without circuit or device level analysis.

In some implementations, the difference in $V_{DS}$ of stacked devices ($V_{DS} = V_{DD}$) may be neglected. When the minimum voltage is 300 mV or higher, the effect of $V_{DS}$ on the off-state leakage current (denoted as $K_{VDS}$) may be calculated for the operating temperature range. Example results are summarized in the Table of FIG. 2, which shows values of $K_{VDS}$ that are very close to one. Accordingly, the effect of $V_{DS}$ on $K_{VDS}$ is negligible, and can be eliminated from the model within a predetermined voltage and temperature range. Consequently, Equation (7) can be simplified to yield:

$$I_{off} = I_0 \exp\left(\frac{-V_{th0} + \lambda_{DS} \cdot V_{DD}}{nV_T}\right).\qquad\text{Eq. (10)}$$

By reorganizing Equation (10), and by generalizing it to reflect the chip-level effects, a simplified model can be expressed as:

$$I_{off\_chip} \cong \left[I_0 \exp\left(\frac{-V_{th0}}{nV_T}\right)\right] \cdot \exp\left(\frac{\lambda_{DS}}{nV_T} \cdot V_{DD}\right) \equiv a \cdot \exp(b \cdot V_{DD}).\qquad\text{Eq. (11)}$$

In Equation (11), a is the amplitude of the exponential relation and b is the rate of change. The value of the amplitude may be defined by the technology, virtual effective threshold voltage, and by the junction temperature during leakage current measurement. The rate of change depends on the temperature, the process non-ideality factor (n which may have a value of 1.5), and the effective value of the DIBL (Drain-Induced Barrier Lowering) coefficient. For a constant temperature and a known design (constant non-ideality factor), b reflects the DIBL coefficient, and its relation to the effective chip-level DIBL coefficient is:

$$\lambda_{DS} b \cdot (nV_T)\qquad\text{Eq. (12).}$$

The unit for b is (mV$^{-1}$), and can be used to predict the effect of supply voltage scaling on the leakage current.

The following equations represent total energy consumption ($E_T$), off-state leakage current model ($I_{off}$), and Alpha model for the cycle time respectively.

$$E_T = A_D \frac{C_D V_{DD}^2}{2} + I_{off} V_{DD} t_{cyl},\qquad\text{Eq. (13A)}$$

$$I_{off} \cong a \cdot e^{(b \cdot V_{DD})},\qquad\text{Eq. (13B)}$$

$$t_{cyl} \cong \frac{V_{DD}}{(V_{DD} - V_{th})^\alpha}.\qquad\text{Eq. (13C)}$$

In the above equations, $A_D$ represents the activity rate, $C_D$ is the equivalent capacitance of DUT, a and b are fitting parameters, $V_{th}$ is the device threshold voltage, and α is the technology Alpha number (typical value of 1.5 or 2). By inserting $t_{cyl}$ and $I_{off}$ into $E_T$, Equation (14) is produced:

$$E_T = A_D \frac{C_D V_{DD}^2}{2} + (a \cdot e^{(b \cdot V_{DD})}) \frac{V_{DD}^2}{(V_{DD} - V_{th})^\alpha}.\qquad\text{Eq. (14)}$$

Figure 3:
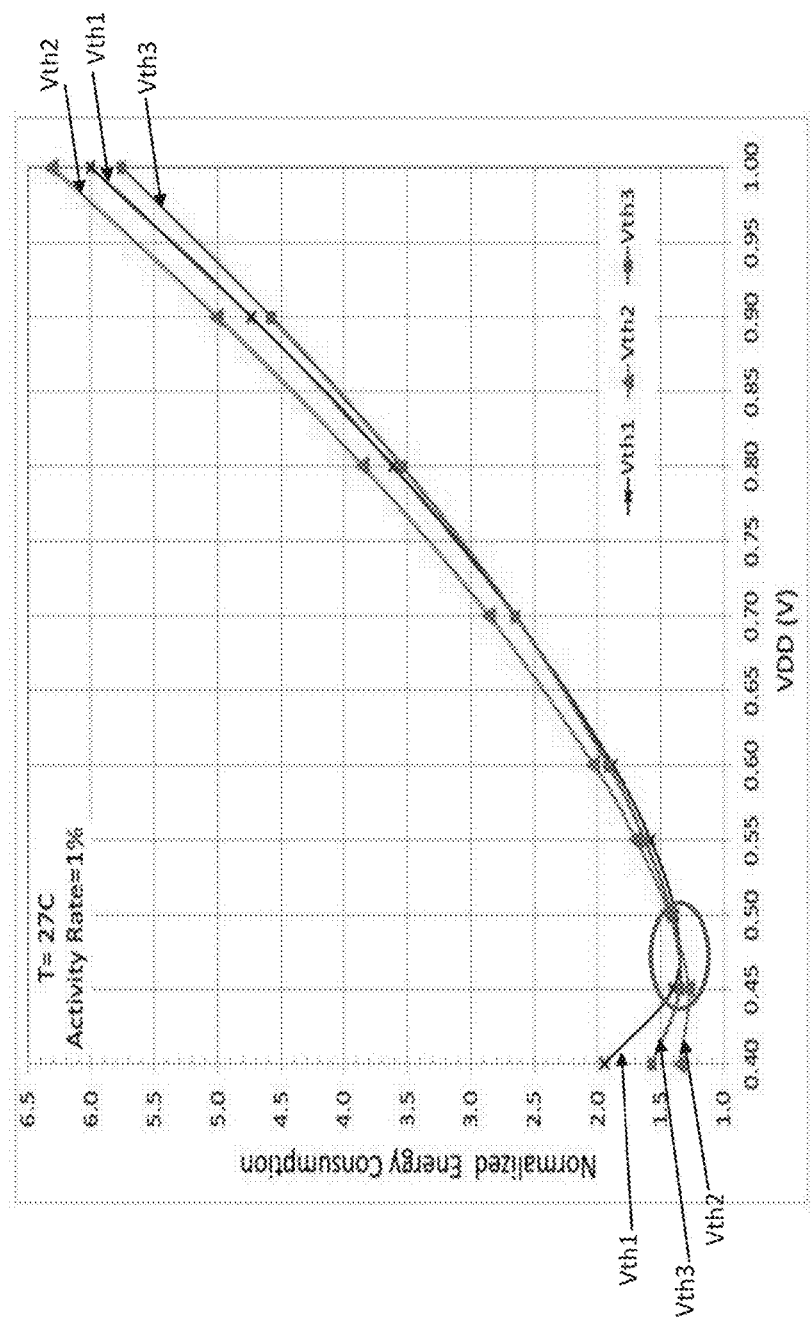
FIG. 3 illustrates an example normalized energy-voltage waveform at a first temperature value for ring-oscillators designed with three different threshold voltage CMOS transistors obtained in accordance with the disclosed embodiments.

From Equation (14), when $V_{DD}$ is reduced to near $V_{th}$, the denominator approaches zero, which means the total energy increases substantially. This is depicted in FIG. 3 and in FIG. 4 for example cases. As noted earlier, the activity factor is another factor affecting total energy consumption. To determine the optimal voltage level, one can determine the derivative of Equation (14) and then calculate the minimum value of $E_T$ and corresponding $V_{DD}$. Alternatively, Equation (14) can be solved numerically for the given design parameters to determine the optimal supply voltage.

Temperature dependence is another important factor in determining the optimal energy consumption. Reducing the temperature increases the threshold voltage ($T_0$ nominal temperature, T the operating temperature). The threshold voltage may be expressed as:

$$V_{th}(T) = V_{th}(T_0) - K_t\left(\frac{T}{T_0} - 1\right).\qquad\text{Eq. (15)}$$

FIG. 3 depicts an example normalized energy-voltage waveform for ring-oscillators designed with three different threshold voltage CMOS transistors at 27 C.

To achieve the minimum energy consumption, the logic circuit operates near the optimal-voltage, which is close to the effective threshold voltage. At optimal supply voltage, the energy efficiency of the devices is maximized leading to the minimum energy consumption. The optimal energy is circled in FIG. 3 for the given circuit.

In an energy-optimal mode in accordance with the disclosed embodiments, the circuit supply voltage is set to the optimal voltage level, and the clock frequency is adjusted dynamically with a fine resolution in a closed loop to avoid timing failure.

A minimum and a maximum clock frequencies may bound the closed-loop operation. A time-delay hysteresis may adjust the closed loop response time to the system requirement.

Figure 4:
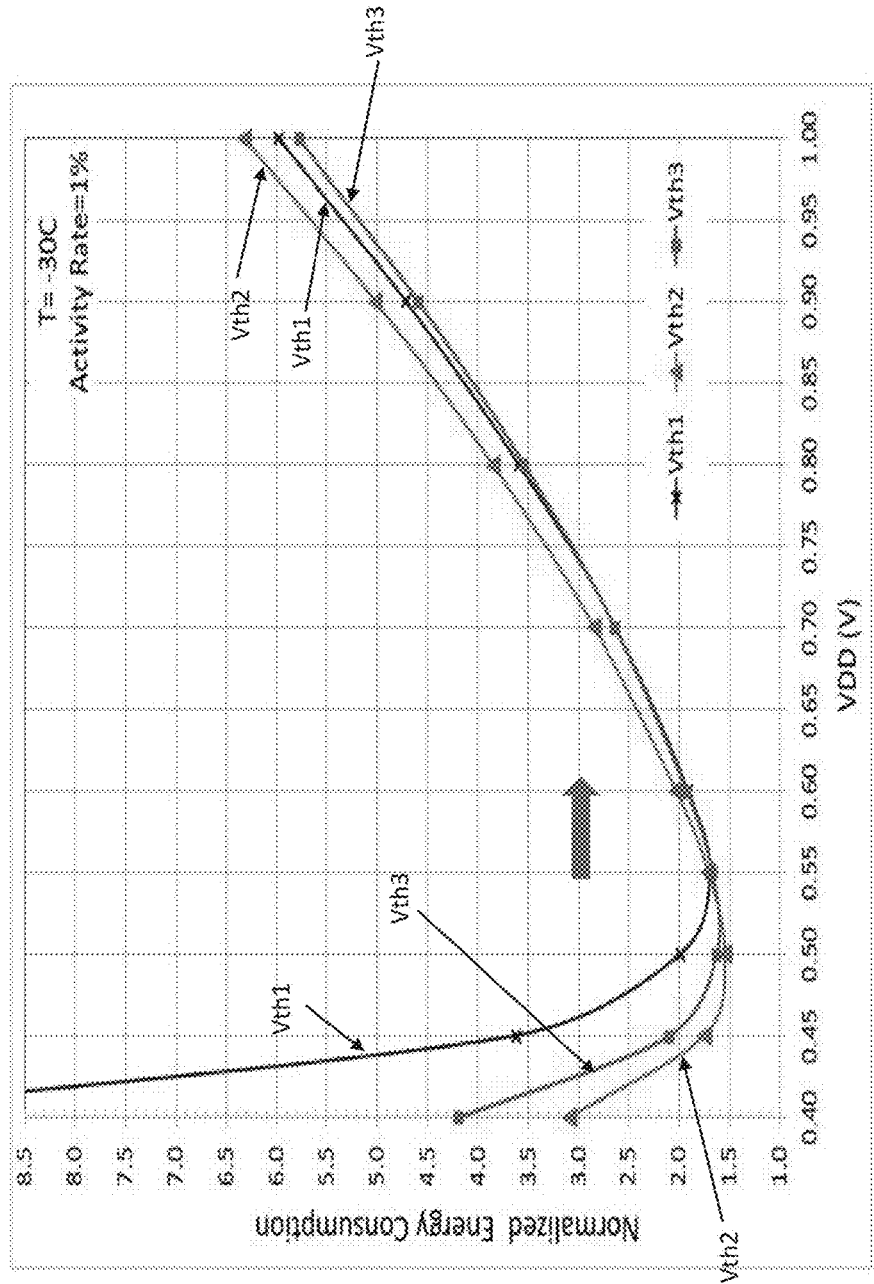
FIG. 4 illustrates an example normalized energy-voltage waveform corresponding to the same transistors as in FIG. 3 but operating at a second temperature value in accordance with the disclosed embodiments.

The optimal supply voltage is function of operating temperature, and as such must be adjusted as the operating temperature changes. FIG. 4 depicts the change in optimal voltage level for the same DUT depicted in FIG. 3 at 27 C, but at −30 C. It also indicates in some cases, such as Vth1, the energy consumption can change sharply at low temperatures and below optimal-level, which makes dynamic compensation essential. Thus, comparison of FIG. 3 and FIG. 4 reveals the dependence of the optimum voltage value both on the temperature and on $V_{th}$. In both FIGS. 3 and 4, $V_{th1}$ has the highest value and $V_{th3}$ has the lowest value in relative terms. In some embodiments, based on the temperature dependency characteristics, a minimum operation voltage for each temperature value (or a range of temperature values) is determined. For example, based on FIGS. 3 and 4, minimum VDD values of 0.45 and 0.55 can be selected for T=27 and T=−30, respectively.

Beside energy saving, adjusting the optimal voltage for temperature alleviates timing closure at extreme temperature range and minimum voltage level, which reduces standard cell drive strength, leading to a lower leakage and silicon area.

In the sections that follow, two methods are described to compensate for the optimal voltage over the operating temperature range; dynamic calculation and lookup table.

In dynamic calculation, the amount of charge or current consumption of the DUT is measured via a current or charge sensor, or the current use is read back from the voltage regulator.

As the operating temperature is reduced, the leakage current is reduced, yet the circuit delay increases leading to a longer cycle time. When the total energy increases from the optimal point, the supply voltage must be increased until the minimum energy point is achieved at which point the optimal supply voltage is reached. Applications and devices that have an integrated voltage regulator can benefit from this method since often there is a built-in current sensor.

A look-up table may be suitable for applications where the current sensor is not available, or its accuracy is not adequate. In such embodiments, the optimal supply voltage dependence on the temperature can be determined off-line via, e.g., SPICE simulation (circuit simulation) or numerical calculation for the DUT. The results can then be stored in a look-up table. For example, the operating temperature can be used as an index to the table, where the output is the optimal voltage level. The firmware or energy management unit (EMU) can adjust the supply voltage level as the operating temperature changes.

Due to process, voltage, temperature (PVT) variations, each DUT produced may experience a different energy-voltage curve. As such, the clock frequency may be adjusted in order to avoid timing failure (e.g., setup time failure). The traditional method is to determine the worst case condition and de-rate the voltage or clock frequency accordingly. Using the traditional method, there is a noticeable performance loss (if reducing the frequency) or power increase (if increasing the voltage) for a majority of the produced parts to cover the range. An alternative method disclosed herein utilizes an adaptive frequency scaling engine to adjust the clock frequency with a fine resolution per device. This disclosed technique reduces the performance margin required, leading to a higher overall performance while operating at an energy-optimal point.

Figure 5:
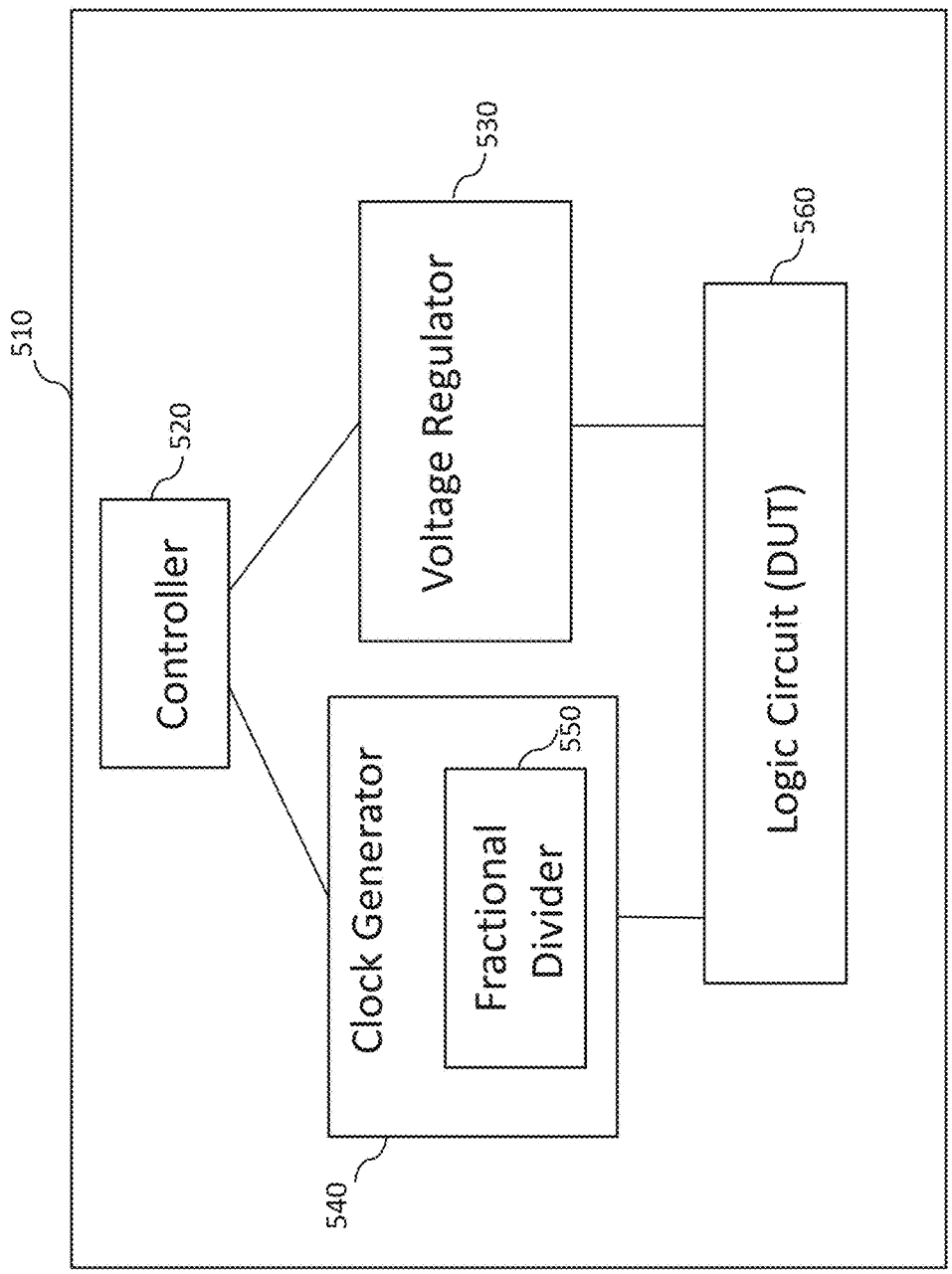
FIG. 5 illustrates an apparatus including a controller, a clock generator, a voltage regulator and a device under test whose performance over temperature is being maintained, in accordance with some example embodiments.

FIG. 5 depicts an example of an apparatus 510, in accordance with some example embodiments. The apparatus includes a controller 520, voltage regulator 530, clock generator 540 which may include fractional divider 550, and logic circuit/device under test 560.

Controller 520 includes one or more processors (e.g., microprocessors) and memory. The memory includes executable instructions that when executed perform the operations described in this patent document. In some example embodiments, controller 520 may be a field programmable gate array (FPGA) or other programmable logic, or may be an application specific integrated circuit (ASIC), or other custom integrated circuit. In some example embodiments, the processor in controller 520 may be the logic circuit 560.

Voltage regulator 530 can be a programmable voltage regulator whose output voltage is controlled by controller 520. For example, executable code in controller 520 may determine that the output voltage from voltage regulator 530 should increase from 1.0V to 1.1V. Controller 520 can adjust a register or via other input/output (I/O) means cause an adjustment to a supply voltage supplied by voltage regulator 530 to logic circuit 560. The voltage regulator 530 is further described in this patent document.

Clock generator 540 can be a programmable clock generator that generates a stream of periodic clock pulses to logic circuit 560. Clock generator 540 may have a fixed clock that is divided down to produce lower clock rates. In some implementations, a fractional divider 550 may be used to generate the lower clock rates. The clock generator 540 and fractional divider 550 are further described in this patent document. The information conveyed from the controller 520 to the voltage regulator 540 and to the clock generator 540 may be in any format that would enable the voltage regulator and the clock generator to maintain or change their outputs, such actual power/clock values to be produced, a change from a previous power/clock value, an index value or other formats.

Logic circuit 560 may be a processor (e.g., a central processing unit (CPU)), a graphics processing unit (GPU), a digital signal processor (DSP), a programmable logic device (PLD), an application specific integrated circuit (ASIC), a system on chip (SoC), a field programmable gate array (FPGA), or any other logic circuit whose performance over temperature is being maintained in an energy optimal fashion. It should be noted that in some implementation, the supply voltage and/or the clock source are integrated inside the same semiconductor as the DUT or on the same package or substrate, or as discrete components assembled on the printed circuit board.

Figure 6:
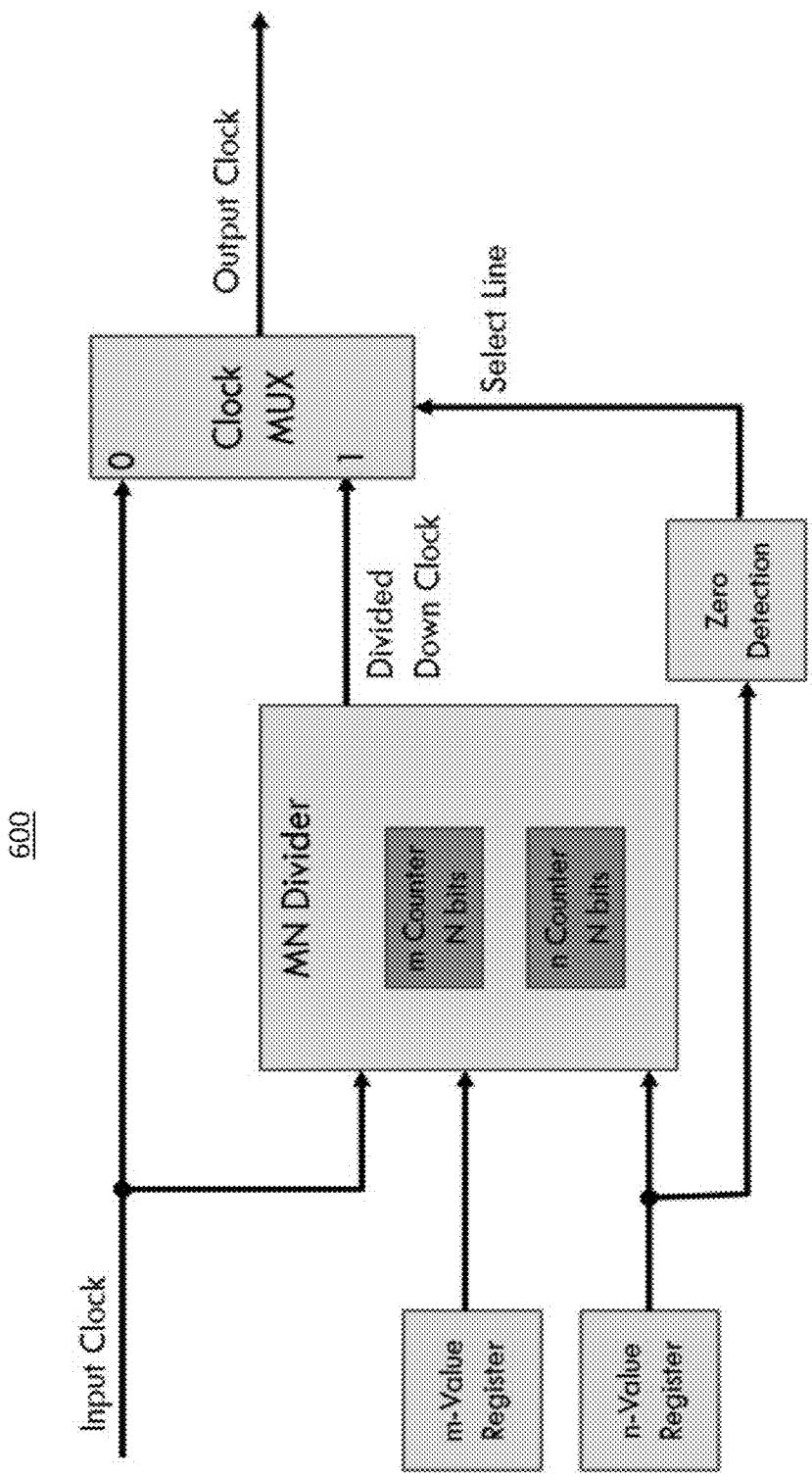
FIG. 6 illustrates a fractional divider in accordance with some example embodiments.

FIG. 6 depicts a fractional divider 600, in accordance with some example embodiments. To provide fine resolution frequency control, a fractional divider is designed, which utilizes two parameters "n" and "m" to set the divider. A fractional divider, is also sometimes referred to as an MN divider. It may be used as a clock divider. For MN divider use-case in EMU, "n" and "m" may both be set to a value from, for example, 8 to 12 bits, or another value.

A method is disclosed herein to generate "n" and "m" values to increase or decrease the clock frequency monotonically. Firmware may not be involved other than for initial settings. To simplify the description of the divider operation, the following assumes that "n" and "m" to have an equal number of bits, denoted by "N." For example, with N=8, n and m are 8-bit values.

The fractional divider is fed with the system clock (labeled as Input Clock in FIG. 6), which is divided down to a selected output frequency. The divisor is denoted by D. Given the divider design, there are multiple combinations of the "n" and "m" values for each value of D.

The following objectives are achieved: 1) Minimize "n" and "m" combinations to have only one combination for each value of D; 2) Changes in "n" and "m" values generate a monotonic frequency change; 3) Achieve a predetermined resolution; and 4) operate the divider using an algorithm that can be implemented in hardware. In some embodiments, to facilitate the implementation of the disclosed techniques, the following conditions or simplifications can be made. These conditions, in-part allow the proper frequency resolution to be maintained while enabling a monotonic change in frequency.

Condition 1: Use only half of "n" and "m" permutation table as follows:

$$n+m \leq 2^N \&\& n \neq 0 \qquad \text{Eq. (16A)}.$$

With above condition in Equation (16A), the equivalent divider value (D), can be estimated by:

$$D = \frac{2 \times (2^N - m)}{n}. \qquad \text{Eq. (16B)}$$

From Equation (16B), it is obvious that if the following holds true:

$$n+m=2^N \qquad \text{Eq. (16C)}$$

then "D" is 2.

Condition 2: For large values of "n", "n" by itself provides a good resolution for the frequency change, however as "n" is reduced, the resolution is decreased, and "m" must be utilized to restore the resolution. The threshold for "n", where utilizing "m" becomes necessary is defined by the application requirement and also by the number of bits associated with each of "n" and "m" values. For example, for N=8 bits, a limit of 64 for "n" is recommended. For all "n"≥64, "m" value can be neglected, and "n" may be changed to adjust the frequency. For "n"<64, first adjust "m" and then "n" to achieve a fine resolution.

Condition 3: In order to achieve a monotonic behavior, the value of "m" is capped for each value of "n." The maximum "m" can be calculated by solving:

$$\frac{2\times(2^N-m)}{n} = \frac{2\times(2^N-m_2)}{n_2}. \quad \text{Eq. (17)}$$

By inserting: m=$m_{max}$, $n_2$=1 and simplifying it, it yields:

$$m_{max} = \frac{2^N-1}{n}. \quad \text{Eq. (18A)}$$

For an 8-bit divider, the nominator is 255 (a constant), so we need to solve 255/n, which is estimated by:

$$m_{max} \approx 255 >> \log_2 n \quad \text{Eq. (18B).}$$

In Equation (18B), the symbol ">>" is the shift to right operator. Equation (18B) can be calculated when "n" is changed to determine the corresponding maximum "m", or alternatively, Equation (18A) can be pre-calculated, and programmed into an RTL select-case to set maximum "m" based on value of "n".

Condition 4: To increase the output clock frequency, "m" is increased until reaching the maximum value of "m", then "m" is set to zero and "n" is increased by 1. To decrease the output clock frequency, "m" is decreased until zero, then "n" is decreased by 1 and "m" is set to maximum "m" associated with the reduced "n" value.

Condition 5: As evident from Eq. (16B), a zero value for "n" leads to division by zero, which must be avoided. Two workarounds can be implemented as follows: (a) Adding a clock multiplexer at the output of the divider that is activated upon a zero value of "n" to bypass the divider, and propagate the input clock to the output. This feature can be utilized during functional test to let test clock propagate through to the logic circuit. (b) Keep the divider output clock at logic zero, when "n" is zero. These techniques are depicted in FIG. 6, where clock multiplexer is positioned to receive the input clock and the divided clock from the MN divider; the zero-detection output is used as a select signal for the multiplexer.

It should be noted that in other implementations, instead of a fractional divider, delay locked loop (DLL) can be used to adjust the clock frequency. In still other embodiments, an integer clock divider can be used instead of a fractional divider to adjust the clock frequency.

Figure 7:
FIG. 7 illustrates a listing of normalized maximum operating frequencies for variety of supply voltages and devices obtained in accordance with some example embodiments.

FIG. 7 depicts an example of a table showing a normalized maximum operating frequency for variety of supply voltages and devices with various threshold voltages in accordance with an example embodiment. The top row of the table shows a supply voltage of 1.00V. The devices perform at the highest frequency at the highest supply voltage reflected by the normalized frequency values of 1.00 for each threshold voltage. As the threshold voltage decreases, the speed of the devices decreases as shown in the table. As the supply voltage continues to be reduced, at some point the devices no longer perform fast enough to meet the timing, or otherwise become too slow. In the example of FIG. 7, when the supply voltage is reduced to 0.500V or below, devices having Vth1 become too slow (circled entries in Vth1 column in FIG. 7, where normalized frequency falls below 0.01) but devices having Vth2 and Vth3 are still fast enough. When the supply voltage is further lowered to 0.450V, devices for all three threshold voltages (Vth1, Vth2, Vth3) become too slow. Thus, in this example, the lowest supply voltage where Vth1, Vth2, and Vth3 devices, which meet target performance is 0.550V. In the example of FIG. 7, Vth1 has a normalized max frequency of 0.0216, Vth2 has a normalized max frequency of 0.0360, and Vth3 has a max normalized frequency of 0.0254 at VDD of 0.550V. The table in FIG. 7 is provided for illustrative purposes, and is not intended to limit the disclosed embodiments to the particular voltage or frequency values that are shown. Different voltages, threshold voltages, and normalized speeds may be used. For example, different semiconductor processes will have different values.

It should be noted that the example table in FIG. 7 can also be used to determine a maximum clock frequency at which the circuit logic can operate for a given supply voltage.

Figure 8:
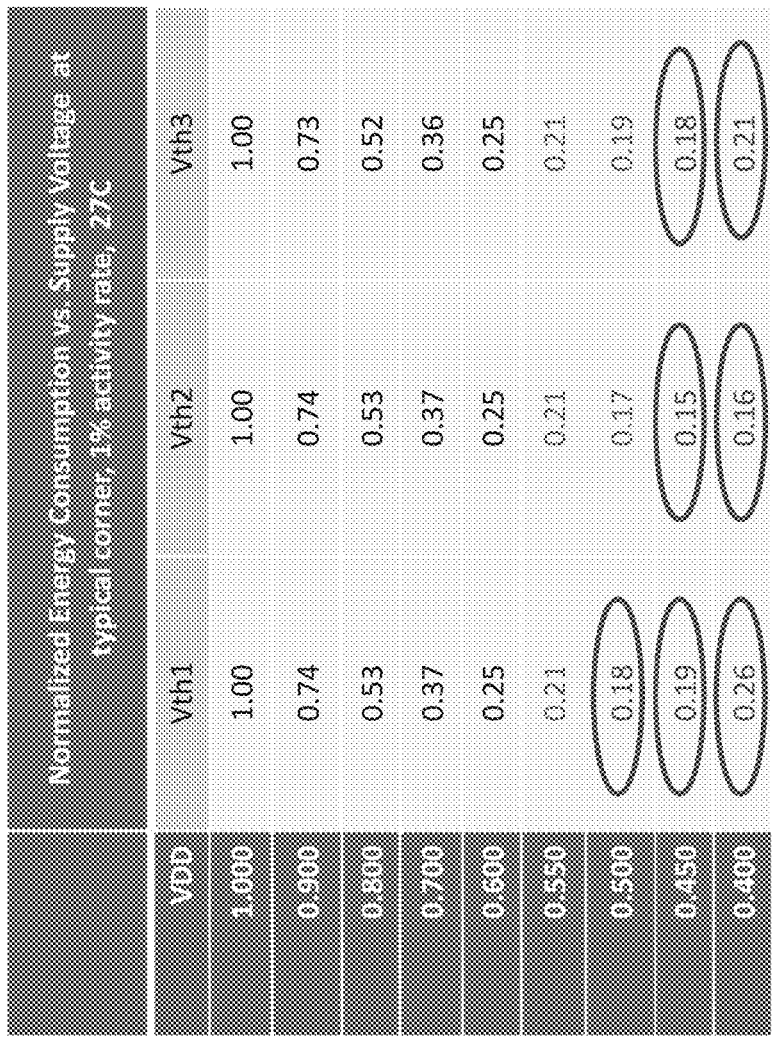
FIG. 8. Illustrates another listing showing normalized energy consumption for variety of supply voltages and devices obtained in accordance with some example embodiments.

FIG. 8. depicts an example of a table showing normalized energy consumption for variety of supply voltages and devices with various threshold voltages in accordance with an example embodiment. As the threshold voltage decreases, the energy consumed by the various devices decreases as shown in the table. As the supply voltage continues to be reduced, at some point the devices no longer perform fast enough to meet the required timing, as described above with respect to FIG. 7. Accordingly, the normalized energy consumption cannot fall below the corresponding supply voltage required to make timing or another speed requirement. Thus, the supply voltage limits found in FIG. 7 (e.g., VDD of 0.550V for Vth1, and VDD of 0.500V for Vth2 and Vth3) are applied in the table in FIG. 8. In the example of FIGS. 7 and 8, the lowest energy consumption while still maintaining the proper timing is 0.550V with a normalized energy consumption of 0.21 for Vth1, Vth2, and Vth3.

Thus in the example tables of FIGS. 7 and 8, the max frequency table is first used to determine the minimum acceptable voltage per Vth at the operating temperature (or to determine the maximum clock frequency for a given supply voltage), and the energy consumption table is used to determine the energy-optimal point to meet the minimum required performance. In some embodiments where there are set limits for the operating temperature and/or load current (e.g., predetermined maximum temperature/current values that should not be exceeded), the controller can be configured to receive an indicator (e.g., a digital signal received as an input) indicating that the set limit for the operating temperature or the load current is being approached, and in response, the controller can reduce the supply voltage and/or the clock rate. The reduction of the supply voltage or the clock rate leads to a reduction of the load current and eventually reduces the operating temperature; when both the load current and the temperature fall within the set limits, the indicator can be de-asserted. At such a time, the controller can start restoring the supply voltage and clock rate. This process can be repeated if and when either of the load current or operating temperature approaches the set limits.

Figure 9:
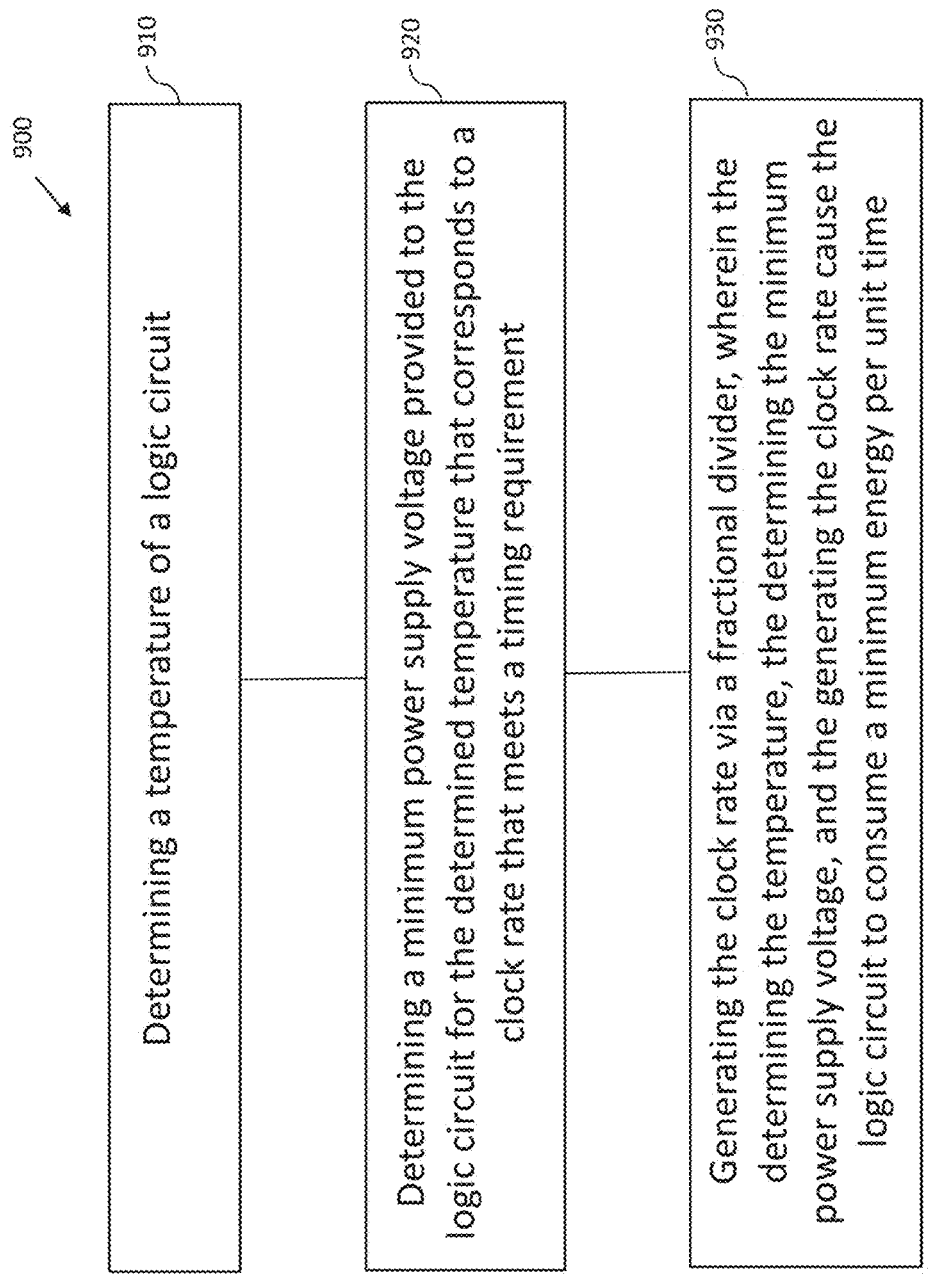
FIG. 9 illustrates a set of operations for supplying voltage to a logic circuit in accordance with some example embodiments.

FIG. 9 depicts a method 900 for supplying voltage to a logic circuit in accordance with some example embodiments. At 910, the method includes determining a temperature of the logic circuit. At 920, the method further includes determining a minimum power supply voltage provided to the logic circuit for the determined temperature that corresponds to a clock rate that meets a timing requirement. At 930, the method further includes generating the clock rate (e.g., via a fractional divider), wherein determining the temperature, determining the minimum power supply voltage, and generating the clock rate cause the logic circuit to consume a minimum energy per unit time. The foregoing method may be repeated periodically or intermittently to update the power supply voltage and/or clock rate. Repeated adjustment over time may be referred to as closed loop operation. The method may be limited by minimum as well as maximum voltage and/or clock rate values. Hysteresis may be used to prevent repeated adjustment or oscillating values of voltage and/or clock rate. In one example, the temperature of the logic circuit is determined by a sensor internal to the logic circuit. Determining a minimum power supply voltage provided to the logic circuit for the determined temperature can be performed using a look-up table. Determining a minimum power supply voltage provided to the logic circuit for the determined temperature can be performed via calculation. The fractional divider output frequency is monotonic with respect to input parameters. For example, the fractional divider is an (m,n) fractional divider. Determining the minimum power supply voltage provided to the logic circuit for the determined temperature can be performed by a processor including memory with executable instructions that when executed determine the minimum power supply voltage to provide to the logic circuit. Furthermore, determining the minimum power supply voltage provided to the logic circuit for the determined temperature can be performed by a programmable logic device that determines the minimum power supply voltage to provide to the logic circuit.

In one example, an apparatus for supplying power to a logic circuit is described that includes a receiver to receive a temperature of the logic circuit, a processor for determining a minimum power supply voltage to provide to the logic circuit for the received temperature that corresponds to a clock rate that meets a timing requirement; and a fractional divider to operate on a clock rate, where the receiver and the processor cause the logic circuit to consume a minimum energy per unit time in accordance with at least the temperature and the output of the fractional divider.

Disclosed herein are methods and devices to determine and adjust a supply voltage to an optimal supply voltage over the operating temperature range utilizing a look-up table containing off-line results or using dynamic calculation.

The disclosed methods and devices can include using an activity monitor circuit or a control signal from hardware (e.g., CPU) or the firmware to increase the performance dynamically by increasing the optimal voltage level and/or maximum clock frequency.

The disclosed methods and devices can include a performance or process monitor sensor in an open or closed loop to adjust the clock frequency. The clock frequency may be adjusted dynamically The disclosed methods and devices can use a time-delay hysteresis to adjust the closed-loop delay or response time.

The disclosed methods and devices can use a minimum and a maximum clock frequency to bound the adaptive frequency scaling engine. The minimum is to guarantee the minimum performance, and the maximum is where the circuit timing is closed at.

The disclosed methods and devices can further take into account the voltage regulator efficiency reduction at low voltage operation to determine the system level optimal operating voltage. In particular, as the supply voltage is reduced, in some cases, the efficiency of the voltage regulator may decline, and as a result the overall energy efficiency is reduced. As such, the voltage regulator efficiency can be included when calculating the energy consumption (e.g. in obtaining the values in FIG. 8).

A fractional divider is disclosed to change the clock frequency monotonically with the adequate resolution.

One aspect of the disclosed technology relates to a method for determining power or clock values for operation of a logic circuit. The method includes obtaining a first temperature of the logic circuit, determining a minimum power supply voltage to be provided to the logic circuit for the first temperature that corresponds to a clock rate that meets a predetermined timing requirement, or a maximum clock frequency for the logic circuit to operate at a given power supply voltage value for the first temperature. The method further includes providing one or both of information regarding the maximum clock rate to a clock generation circuit of the logic circuit or information regarding the minimum power supply voltage to a voltage regulator of the logic circuit. The minimum power supply voltage or the maximum clock frequency are determined to cause the logic circuit to consume a minimum energy per unit time for the first temperature.

In one example embodiment, the first temperature of the logic circuit is obtained from a sensor internal to the logic circuit. In another example embodiment, determining the minimum power supply voltage or the maximum clock frequency for the first temperature is performed using one or more look-up tables that relate power supply voltage values to maximum clock frequency values. In yet another example embodiment, the one or more look-up tables relate power supply voltage values to maximum clock frequency values for each of a plurality of different semiconductor devices that operate at different threshold values. In one example embodiment, the one or more look-up tables relate power supply voltage values to optimized energy consumption values for the logic circuit. In another example embodiment, the one or more look-up tables are compiled for a plurality of temperature values, where the first temperature is one index value from a plurality of index values that enables access to at least one look-up table.

According to one example embodiment, determining the minimum power supply voltage or the maximum clock frequency for the first temperature is performed by an electronic circuit that implements one or more equations that estimate a relationship between power supply voltage values, maximum clock frequency values and minimum energy consumption values for the logic circuit. In another example embodiment, the logic circuit includes a plurality of different types of electronic devices, each electronic device having a corresponding threshold voltage value. In this embodiment, determining the minimum power supply voltage includes determining a single power supply voltage value for all of the plurality of different types of electronic devices. In another example embodiment, the clock generator circuit includes a fractional divider having an output frequency. For example, the fractional divider can be an (m,n) fractional divider, where m and n are integer values input to the clock generator circuit selected to increase or decrease an output frequency of the clock generator circuit monotonically.

In another example embodiment determining the minimum power supply voltage is performed by a processor including memory with executable instructions that when executed determine the minimum power supply voltage. In yet another example embodiment, determining the minimum power supply voltage or the maximum clock frequency are carried out dynamically in continuous, intermittent or periodic time intervals in a closed-loop configuration to maintain energy consumption of the logic circuit at or close to the minimum energy consumption based on at least a change in the first temperature to a second temperature.

In one example embodiment, the above noted method for determining power or clock values also includes applying a time-delay hysteresis to adjust a response time of the closed-loop configuration. In another example embodiment, each of the clock frequency and the power supply voltage are confined within a corresponding range of values that bound adjustments to the clock frequency and the power supply voltage values. In yet another example embodiment, the above noted method for determining power or clock values further includes receiving an indication that one or both an operating temperature or a load current of the logic circuit is approaching corresponding set limits, and generating a signal indicative of a change in the power supply voltage or the clock rate.

Another aspect of the disclosed technology relates to an apparatus for determining power or clock values for operation of a logic circuit. The apparatus includes a receiver to receive a first temperature of the logic circuit, and a processor coupled to a non-transitory memory that includes instructions stored thereon. The instructions when executed by the processor cause the processor to determine a minimum power supply voltage to be provided to the logic circuit for the first temperature that corresponds to a clock rate that meets a predetermined timing requirement, or a maximum clock frequency for the logic circuit to operate at a given power supply voltage value for the first temperature. The instructions when executed by the processor further cause the processor to provide one or both of information regarding the maximum clock rate to a clock generation circuit of the logic circuit or information regarding the minimum power supply voltage to a voltage regulator of the logic circuit. The determined minimum power supply voltage or the maximum clock frequency allowing the logic circuit to operate in a region of optimum energy consumption the first temperature.

In one example embodiment, the first temperature of the logic circuit is received from a sensor internal to the logic circuit. In another example embodiment, the instructions when executed by the processor cause the processor to determine the minimum power supply voltage or the maximum clock frequency for the first temperature using one or more look-up tables that relate power supply voltage values to maximum clock frequency values. In another example embodiment, the one or more look-up tables relate power supply voltage values to maximum clock frequency values for each of a plurality of different semiconductor devices that operate at different threshold values. In yet another example embodiment, the one or more look-up tables relate power supply voltage values to optimized energy consumption values for the logic circuit. In still another example embodiment, the one or more look-up tables include look-up tables compiled for a plurality of temperature values, and the first temperature is one index value from a plurality of index values that enables access to at least one look-up table.

According to one example embodiment, the logic circuit includes a plurality of different types of electronic devices, where each electronic device has a corresponding threshold voltage value, and where the instructions upon execution by the processor cause the processor to determine a single power supply voltage value for all of the plurality of different types of electronic devices. In another example embodiment, the instructions when executed by the processor cause the processor to determine the minimum power supply voltage or the maximum clock frequency dynamically in continuous, intermittent or periodic time intervals in a closed-loop configuration to maintain energy consumption of the logic circuit at the minimum energy consumption based on at least a change in the first temperature to a second temperature. In yet another example embodiment, the instructions when executed by the processor cause the processor to apply a time-delay hysteresis to adjust a response time of the closed-loop configuration.

Another aspect of the disclosed technology relates to a system for determining power or clock values for operation of a circuit. The system includes a processor circuit configured to receive a first temperature value of an electronic circuit and to determine a minimum power supply voltage to be provided to the electronic circuit for the first temperature value that corresponds to a clock rate that meets a predetermined timing requirement, or a maximum clock frequency for the electronic circuit to operate at a given power supply voltage value for the first temperature value. The processor circuit is further configured to provide one or both of information regarding the maximum clock rate to a clock generation circuit of the electronic circuit or information regarding the minimum power supply voltage to a voltage regulator circuit. The minimum power supply voltage or the maximum clock frequency are determined to cause the electronic circuit to consume a predetermined amount of voltage or current at the first temperature. The above noted system further includes the voltage regulator circuit coupled to the processor circuit and configured to receive one or more signals from the processor circuit and to increase or decrease a voltage value supplied to the electronic circuit in accordance to the one or more signals.

In an example embodiment, the system includes the clock generator circuit, where the clock generator circuit includes a fractional divider. In another example embodiment, the fractional divider is an (m,n) fractional divider, where m and n are integer values input to the clock generator circuit selected to increase or decrease an output frequency of the clock generator circuit monotonically. In yet another example embodiment, the system includes the electronic circuit, where one or more of: (a) the processor circuit, (b) the voltage regulator circuit, (c) a temperature sensor configured to measure the first and additional temperature values of the electronic device, or (d) the clock generator circuit are implemented as part of the electronic device. In another example embodiment, the predetermined amount of voltage or current corresponds to an optimum or a minimum energy consumption value for operation of the electronic circuit. In still another example embodiment, the processor circuit is configured to receive additional temperature values of the electronic device, and to provide adjustments to the minimum power supply voltage or the maximum clock frequency dynamically in continuous, intermittent or periodic time intervals to maintain energy consumption of the logic circuit at a desired energy consumption level based on at least a change in the first temperature to a second temperature.

The subject matter described herein may be embodied in systems, apparatus, methods, and/or articles depending on the desired configuration. For example, at least a portion of the systems, apparatus, methods, and/or articles described herein can be implemented using one or more of the following: one or more semiconductor materials or substrates such as silicon, printed circuit board techniques, discrete electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein.

Although a few variations have been described in detail above, other modifications or additions are possible. In particular, further features and/or variations may be provided in addition to those set forth herein. Additionally, different disclosed embodiments may be combined with one another. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings or described in a particular order, this should not be understood as requiring that such operations be performed in the particular order shown or descried or in sequential order, or that all operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for determining power or clock values for operation of a logic circuit, the method comprising:
   obtaining a first temperature of the logic circuit;
   determining a minimum power supply voltage to be provided to the logic circuit for the first temperature that corresponds to a clock rate that meets a predetermined timing requirement, or a maximum clock frequency for the logic circuit to operate at a given power supply voltage value for the first temperature; and
   providing one or both of information regarding the maximum clock rate to a clock generation circuit of the logic circuit or information regarding the minimum power supply voltage to a voltage regulator of the logic circuit, wherein
   the minimum power supply voltage or the maximum clock frequency are determined to cause the logic circuit to consume a minimum energy per unit time for the first temperature,
   wherein the logic circuit includes a plurality of different types of electronic devices, each electronic device having a corresponding threshold voltage value, and wherein determining the minimum power supply voltage includes determining a single power supply voltage value for all of the plurality of different types of electronic devices.

2. The method of claim 1, wherein the first temperature of the logic circuit is obtained from a sensor internal to the logic circuit.

3. The method of claim 1, wherein determining the minimum power supply voltage or the maximum clock frequency for the first temperature is performed using one or more look-up tables that relate power supply voltage values to maximum clock frequency values.

4. The method of claim 3, wherein the one or more look-up tables relate power supply voltage values to maximum clock frequency values for each of a plurality of different semiconductor devices that operate at different threshold values.

5. The method of claim 3, wherein the one or more look-up tables relate power supply voltage values to optimized energy consumption values for the logic circuit.

6. The method of claim 3, wherein the one or more look-up tables are compiled for a plurality of temperature values, and wherein the first temperature is one index value from a plurality of index values that enables access to at least one look-up table.

7. The method of claim 1, wherein determining the minimum power supply voltage or the maximum clock frequency for the first temperature is performed by an electronic circuit that implements one or more equations that estimate a relationship between power supply voltage values, maximum clock frequency values and minimum energy consumption values for the logic circuit.

8. The method of claim 1, wherein the clock generator circuit includes a fractional divider having an output frequency.

9. The method of claim 8, wherein the fractional divider is an (m,n) fractional divider, where m and n are integer values input to the clock generator circuit selected to increase or decrease an output frequency of the clock generator circuit monotonically.

10. The method of claim 1, wherein determining the minimum power supply voltage is performed by a processor including memory with executable instructions that when executed determine the minimum power supply voltage.

11. The method of claim 1, wherein determining the minimum power supply voltage or the maximum clock frequency are carried out dynamically in continuous, intermittent or periodic time intervals in a closed-loop configuration to maintain energy consumption of the logic circuit at or close to the minimum energy consumption based on at least a change in the first temperature to a second temperature.

12. The method of claim 11, further including applying a time-delay hysteresis to adjust a response time of the closed-loop configuration.

13. The method of claim 1, wherein each of the clock frequency and the power supply voltage are confined within a corresponding range of values that bound adjustments to the clock frequency and the power supply voltage values.

14. The method of claim 1, further comprising receiving an indication that one or both an operating temperature or a load current of the logic circuit is approaching corresponding set limits, and generating a signal indicative of a change in the power supply voltage or the clock rate.

15. An apparatus for determining power or clock values for operation of a logic circuit, the apparatus comprising:
a receiver to receive a first temperature of the logic circuit;
a processor coupled to a non-transitory memory including instructions stored thereon, the instructions when executed by the processor causing the processor to:
determine a minimum power supply voltage to be provided to the logic circuit for the first temperature that corresponds to a clock rate that meets a predetermined timing requirement, or a maximum clock frequency for the logic circuit to operate at a given power supply voltage value for the first temperature; and
provide one or both of information regarding the maximum clock rate to a clock generation circuit of the logic circuit or information regarding the minimum power supply voltage to a voltage regulator of the logic circuit, wherein
the minimum power supply voltage or the maximum clock frequency are determined to allow the logic circuit to operate in a region of optimum energy consumption for the first temperature,
wherein the logic circuit includes a plurality of different types of electronic devices, each electronic device having a corresponding threshold voltage value, and wherein the instructions upon execution by the processor cause the processor to determine a single power supply voltage value for all of the plurality of different types of electronic devices.

16. The apparatus of claim 15, wherein the first temperature of the logic circuit is received from a sensor internal to the logic circuit.

17. The apparatus of claim 15, wherein the instructions when executed by the processor cause the processor to determine the minimum power supply voltage or the maximum clock frequency for the first temperature using one or more look-up tables that relate power supply voltage values to maximum clock frequency values.

18. The apparatus of claim 17, wherein the one or more look-up tables relate power supply voltage values to maximum clock frequency values for each of a plurality of different semiconductor devices that operate at different threshold values.

19. The apparatus of claim 17, wherein the one or more look-up tables relate power supply voltage values to optimized energy consumption values for the logic circuit.

20. The apparatus of claim 17, wherein the one or more look-up tables including look-up tables compiled for a plurality of temperature values, and wherein the first temperature is one index value from a plurality of index values that enables access to at least one look-up table.

21. The apparatus of claim 15, wherein the instructions when executed by the processor cause the processor to determine the minimum power supply voltage or the maximum clock frequency dynamically in continuous, intermittent or periodic time intervals in a closed-loop configuration to maintain energy consumption of the logic circuit at the minimum energy consumption based on at least a change in the first temperature to a second temperature.

22. The apparatus of claim 21, the instructions when executed by the processor cause the processor to apply a time-delay hysteresis to adjust a response time of the closed-loop configuration.

23. The apparatus of claim 15, wherein each of the clock frequency and the power supply voltage are confined within a corresponding range of values that bound adjustments to the clock frequency and the power supply voltage values.

24. A system for determining power or clock values for operation of a circuit, comprising:
a processor circuit configured to:
receive a first temperature value of an electronic circuit;
determine a minimum power supply voltage to be provided to the electronic circuit for the first temperature value that corresponds to a clock rate that meets a predetermined timing requirement, or a maximum clock frequency for the electronic circuit to operate at a given power supply voltage value for the first temperature value; and
provide one or both of information regarding the maximum clock rate to a clock generation circuit of the electronic circuit or information regarding the minimum power supply voltage to a voltage regulator circuit, wherein the minimum power supply voltage or the maximum clock frequency are determined to cause the electronic circuit to consume a predetermined amount of voltage or current at the first temperature; and
the voltage regulator circuit coupled to the processor circuit configured to receive one or more signals from the processor circuit and to increase or decrease a voltage value supplied to the electronic circuit in accordance to the one or more signals,
wherein the electronic circuit includes a plurality of different types of electronic devices, each electronic device having a corresponding threshold voltage value, and wherein the processor circuit is configured to determine a single power supply voltage value for all of the plurality of different types of electronic devices.

25. The system of claim 24, comprising the clock generator circuit, wherein the clock generator circuit includes a fractional divider.

26. The system of claim 25, wherein the fractional divider is an (m,n) fractional divider, where m and n are integer values input to the clock generator circuit selected to increase or decrease an output frequency of the clock generator circuit monotonically.

27. The system of claim 24, comprising the electronic circuit, wherein one or more of: (a) the processor circuit, (b) the voltage regulator circuit, (c) a temperature sensor configured to measure the first and additional temperature values of the electronic device, or (d) the clock generator circuit are implemented as part of the electronic device.

28. The system of claim 24, wherein the predetermined amount of voltage or current corresponds to an optimum or a minimum energy consumption value for operation of the electronic circuit.

29. A method for determining power or clock values for operation of a logic circuit, the method comprising:
obtaining a first temperature of the logic circuit;
determining a minimum power supply voltage to be provided to the logic circuit for the first temperature that corresponds to a clock rate that meets a predetermined timing requirement, or a maximum clock frequency for the logic circuit to operate at a given power supply voltage value for the first temperature; and providing one or both of information regarding the maximum clock rate to a clock generation circuit of the logic circuit or information regarding the minimum power supply voltage to a voltage regulator of the logic circuit, wherein the minimum power supply voltage or the maximum clock frequency are determined to cause the logic circuit to consume a minimum energy per unit time for the first temperature, wherein determining the minimum power supply voltage or the maximum clock frequency for the first temperature is performed by an electronic circuit that implements one or more equations that estimate a relationship between power supply voltage values, maximum clock frequency values and minimum energy consumption values for the logic circuit.

30. The method of claim 29, wherein determining the minimum power supply voltage or the maximum clock frequency for the first temperature is performed using one or more look-up tables that relate power supply voltage values to maximum clock frequency values.

\* \* \* \* \*